(12) United States Patent
Dewa

(10) Patent No.: US 8,799,975 B2
(45) Date of Patent: Aug. 5, 2014

(54) SYSTEM AND METHOD FOR PROVIDING CONTENT ASSOCIATED WITH A TELEVISION BROADCAST

(75) Inventor: Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 1536 days.

(21) Appl. No.: 10/310,539

(22) Filed: Dec. 5, 2002

(65) Prior Publication Data
US 2003/0126616 A1 Jul. 3, 2003

(51) Int. Cl.
*H04N 7/173* (2011.01)

(52) U.S. Cl.
USPC .......................... 725/112; 725/109; 725/110

(58) Field of Classification Search
USPC ........................................................ 725/112
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,326,982 B1 * | 12/2001 | Wu et al. | 715/718 |
| 6,941,574 B1 * | 9/2005 | Broadwin et al. | 725/37 |
| 7,117,517 B1 * | 10/2006 | Milazzo et al. | 725/60 |
| 2002/0162117 A1 * | 10/2002 | Pearson et al. | 725/109 |
| 2002/0162118 A1 * | 10/2002 | Levy et al. | 725/110 |
| 2006/0031883 A1 * | 2/2006 | Ellis et al. | 725/58 |
| 2006/0195878 A1 * | 8/2006 | Pack et al. | 725/113 |
| 2007/0044010 A1 * | 2/2007 | Sull et al. | 715/500.1 |
| 2008/0256583 A1 * | 10/2008 | Liwerant et al. | 725/112 |

FOREIGN PATENT DOCUMENTS

| | | |
|---|---|---|
| JP | 2001-309349 | 2/2001 |
| JP | 2001-125914 | 5/2001 |
| JP | 2001-258011 | 9/2001 |
| JP | 2001-297106 | 10/2001 |
| JP | 2001-325275 | 11/2001 |

* cited by examiner

*Primary Examiner* — Nasser Goodarzi
*Assistant Examiner* — Fred Peng
(74) *Attorney, Agent, or Firm* — Finnegan Henderson Farabow Garrett & Dunner LLP

(57) ABSTRACT

The present invention is intended to link television broadcast content and Web content with each other so that both types of content match the characteristics of television media, and prevent the viewing of television broadcasting from being interrupted. An associated information providing method for providing associated information linked with a video to an audience includes the steps of: receiving select information for selecting the video viewed by the audience and audience identification information for identifying the audience; retrieving locational information on a network of associated information about contents of the video viewed by the audience on the basis of the received select information; and transmitting the retrieved locational information to the audience on the basis of the audience identification information.

18 Claims, 5 Drawing Sheets

- PLAYER NAME
- IMAGE
- URI

```
THE INFORMATION YOU CLIPPED
IN PROGRAM "○○○○" ON
X MONTH, x DAY IS AS FOLLOWS.

· IMAGE:     (URI)
· SOUND:     (URI)
· PRODUCT:   (URI)
              ⋮
```
~40

FIG. 5A
PROGRAM DB 51
| TIME ID | STILL PICTURE | MUDIC ID | OTHER CONTENT |
|---|---|---|---|
| ⋮ | ⋮ | ⋮ | ⋮ |
| 1449 |  | 5 | |
| 1500 |  | 5 | |
| 1501 |  | 5 | |
FIG. 5B
CONTENT DB 52
| MUSIC ID | MUSIC DATA | AUTHOR | META DATA |
|---|---|---|---|
| 4 | ⋮ | ⋮ | ⋮ |
| 5 | xxx.mp3 | y.yyyy | ... |
| 6 | ⋮ | ⋮ | ⋮ |
FIG. 5C
AUDIENCE DB 53
| AUDIENCE ID | MAIL ADDRESS | OTHER INFORMATION |
|---|---|---|
| ⋮ | ⋮ | ⋮ |
| ~.0042.~ | | |
| ~.0043.~ | xxx@xxx.xx.xx | ... |
| ~.0044.~ | | |

SYSTEM AND METHOD FOR PROVIDING CONTENT ASSOCIATED WITH A TELEVISION BROADCAST

BACKGROUND OF THE INVENTION

The present invention relates to an associated information providing method, an associated information providing apparatus, an associated information providing program, a content providing system, a content providing apparatus, a content providing method, a content providing program, a content request apparatus, a content request method, a content request program, and a content accumulating apparatus for easily providing the information associated with content data broadcast in broadcast programs.

In digital television broadcasting, the data broadcasting has started in which data signals other than television signals are superimposed on digital television signals. Television receivers compatible with the data broadcasting display the content transmitted on data signals in response to a signal transmitted from a remote control commander for example operated by a user. The framework in which interactive reactions can be displayed based on user operations is already available.

Along with the popularization of the Internet, huge amounts of content are available at various Web sites on the Internet. The content may be retrieved by use of such information equipment connected to the Internet as personal computers for example. Recently, the content on the Internet may also be retrieved by mobile communication terminals such as mobile phones.

However, a problem is recognized today that the content provided by the above-mentioned data broadcasting based on the digital television broadcasting is not linked with the content on the Internet. Obviously, there is also a problem that the content of the ordinary television broadcasting not compatible with the data broadcasting is not linked to the content on the Internet.

Now, assume the case in which data broadcast content and Internet content are simply linked with each other, for example. In this case, the Internet content provided by Web sites may be viewed by use of television receivers compatible with the data broadcasting for example. In the following description, the content on the Internet is restricted to the content provided by Web sites and referred to as Web content.

Most Web content is configured for the purpose of the searching and browsing by personal computers. Also, Web content is supposed to be processed after searching and browsing by personal computers. On the contrary, because of the characteristic of television media which are broadcast for general public, the content provided by the data broadcasting is basically passive in its nature. The content provided by the data broadcasting obviously differs in the use of bidirectional capabilities from the Web content.

To be more specific, the above-mentioned digital television broadcasting and data broadcasting generally include, in one program, many pieces of content of various types such as image data, audio data (or music data), and text data for example. In addition, these many pieces of content change from time to time in one program from its start to end. Therefore, simply linking a program with Web content presents a problem that it is difficult to identify which content in the program is linked to Web content.

Still another problem is that simply displaying Web content on the screen of a television receiver does not always satisfy user needs.

It is thought that the audience of television broadcasting have two desires which are contrary to each other; sharing the information provided by television broadcasting and getting the information satisfying the unique demand of each audience. At the same time, the audience of television broadcasting has also a desire not to tear oneself away from an on-going television program, or not to be interrupted in one's viewing of a television program. There is no related-art technologies as long as the applicant hereof is informed which realize systems for satisfying these desires at the same time.

SUMMARY OF THE INVENTION

It is therefore an object of the present invention to provide an associated information providing method, an associated information providing apparatus, an associated information providing program, a content providing system, a content providing apparatus, a content providing method, a content providing program, a content request apparatus, a content request method, a content request program, and a content accumulating apparatus which link television broadcast content and Web content with each other so that both types of content match the characteristics of television media, and prevent the viewing of television broadcasting from being interrupted.

According to the first aspect of the present invention, there is provided an associated information providing method for providing associated information linked with a video to an audience, including the steps of:

receiving select information for selecting the video viewed by the audience and audience identification information for identifying the audience;

retrieving locational information on a network of associated information about contents of the video viewed by the audience on the basis of the received select information;

and transmitting the retrieved locational information to the audience on the basis of the audience identification information.

According to the second aspect of the present invention, there is provided an associated information providing apparatus for providing associated information linked with a video to an audience, including:

transmitting means for transmitting select information for selecting the video viewed by the audience and audience identification information for identifying the audience;

retrieving means for retrieving locational information on a network of associated information associated with contents of the viewed video on the basis of the transmitted select information; and transmitting means for transmitting the retrieved locational information to the audience on the basis of the audience identification information.

According to the third aspect of the present invention, there is provided an associated information providing program for causing a computer to execute an associated information providing method for providing associated information linked with a video, including the steps of:

receiving select information for selecting the video viewed by the audience and audience identification information for identifying the audience;

retrieving locational information on a network of associated information about contents of the video viewed by the audience on the basis of the received select information;

and transmitting the retrieved locational information to the audience on the basis of the audience identification information.

According to the fourth aspect of the present invention, there is provided a content providing system for providing content linked with a broadcast program to an audience, including:

program viewing means for viewing the broadcast program;

select information transmitting means for transmitting select information about contents of the broadcast program viewed by the audience through the program viewing method and audience identification information for identifying the audience;

content storage means for storing content associated with the contents of the broadcast program into a predetermined location on a network;

a first database for storing locational information on the network of the content storage means;

a second database for storing a relationship between the locational information about the content on the network stored in the first database and the broadcast program;

a third database for storing the audience identification information and address information for transmitting data to the audience; and locational information transmitting means for searching the first database and the second database on the basis of the select information transmitted by the select information transmitting means, retrieving, as a result of the searching, locational information on the network of the content associated with the contents of the broadcast program, searching the third database on the basis of the audience identification information, retrieving, as a result of the searching, the address information, and transmitting, to the audience, locational information on the network of the content associated with the contents of the broadcast program retrieved as the result of the searching of the first database and the second database for an address indicated by the retrieved address information.

According to the fifth aspect of the present invention, there is provided a content providing apparatus for providing content linked with a broadcast program, including:

a first database for storing locational information on a network of content associated with contents of the broadcast program;

a second database for storing a relationship between the locational information about the content on the network stored in the first database and the broadcast program;

a third database for storing the audience identification information and address information for transmitting data to the audience identification information and the audience;

communication means for executing communication with the audience; and transmitting means for searching the first database and the second database on the basis of select information transmitted by the audience through the communication means, retrieving, as a result of the searching, the locational information on the network of the content associated with the contents of the broadcast program, searching the third database on the basis of the audience identification information transmitted with the select information through the communication means, retrieving the address information as a result of the searching, and transmitting, to the audience through the communication means, the locational information on the network retrieved as the results of the searching of the first database and the second database for an address indicated by the retrieved address information.

According to the sixth aspect of the present invention, there is provided a content providing method for providing content linked with a broadcast program to an audience, including the steps of:

executing communication with a user; and searching a first database storing locational information on a network of content on the content linked with contents of the content broadcast on the basis of select information for the contents of the broadcast content to be selected by the user transmitted in the communication step and a second database for storing a relationship between the locational information on the network stored in the first database and the broadcast content, retrieving, as a result of the searching, the locational information on the network of the content on the network linked with the contents of the broadcast content, searching a third database for storing user identification information for identifying the user on the basis of the user identification information transmitted with the select information in the communication step and address information for transmitting data to the user, retrieving the address information as a result of the searching of the third database, and transmitting, through the communication step, the locational information retrieved as the results of the searching of the first database and the second database to an address indicated by the address information retrieved as a result of the searching of the third database.

According to the seventh aspect of the present invention, there is provided a content providing program for causing a computer to execute a content providing method for providing content linked with a broadcast program to an audience, including the steps of:

executing communication with a user; and searching a first database storing locational information on a network of content on the content linked with contents of the content broadcast on the basis of select information for the contents of the broadcast content to be selected by the user transmitted in the communication step and a second database for storing a relationship between the locational information on the network stored in the first database and the broadcast content, retrieving, as a result of the searching, the locational information on the network of the content on the network linked with the contents of the broadcast content, searching a third database for storing user identification information for identifying the user on the basis of the user identification information transmitted with the select information in the communication step and address information for transmitting data to the user, retrieving the address information as a result of the searching of the third database, and transmitting, through the communication step, the locational information retrieved as the results of the searching of the first database and the second database to an address indicated by the address information retrieved as a result of the searching of the third database.

According to the eighth aspect of the present invention, there is provided a content request apparatus for requesting content linked with a broadcast program being viewed, including:

broadcast program viewing means for receiving the broadcast program and viewing the received broadcast program;

communication means for executing communication with the outside; and transmitting means for retrieving locational information on a network of content on the network associated with contents of content broadcast in the broadcast program on the basis of a select information transmitted by a user and transmitting, through the communication means, the select information for the broadcast program viewed through the broadcast program viewing means and user identification information for identifying the user transmitted from the user to a content providing source adapted to transmit the retrieved locational information with the select information to the user on the basis of the user identification information.

According to the ninth aspect of the present invention, there is provided a content request method for requesting content linked with a broadcast program being viewed, including the steps of:

receiving the broadcast program and viewing the received broadcast program;

executing communication with the outside; and retrieving locational information on a network of content on the network associated with contents of content broadcast in the broadcast program on the basis of a select information transmitted by a user and transmitting, through the communication means, the select information for the broadcast program viewed through the broadcast program viewing step and user identification information for identifying the user transmitted from the user to a content providing source adapted to transmit the retrieved locational information with the select information to the user on the basis of the user identification information.

According to the tenth aspect of the present invention, there is provided a content request program for causing a computer apparatus to execute a content request method for requesting content linked with a broadcast program being viewed, including the steps of:

receiving the broadcast program and viewing the received broadcast program;

executing communication with the outside; and retrieving locational information on a network of content on the network associated with contents of content broadcast in the broadcast program on the basis of a select information transmitted by a user and transmitting, through the communication means, the select information for the broadcast program viewed through the broadcast program viewing step and user identification information for identifying the user transmitted from the user to a content providing source adapted to transmit the retrieved locational information with the select information to the user on the basis of the user identification information.

According to the eleventh aspect of the present invention, there is provided a content providing system for providing content linked with a broadcast program to an audience, including:

content providing means for providing content by a broadcast program to the audience through a broadcasting network;

information requesting means for requesting, from the audience through a network corresponding to the broadcasting network, information corresponding to the content being viewed on the broadcasting network;

locational information notifying means for notifying, on the basis of the request, the audience of locational information on the Internet on which the information corresponding to the content exists; and information retrieving means for retrieving, by the audience on the basis of the locational information, the information corresponding to the content on a network other than the broadcasting network.

According to the twelfth aspect of the present invention, there is provided a content providing method for providing content linked with a broadcast program, including the steps of:

providing content by a broadcast program to the audience through a broadcasting network;

requesting, from the audience through a network corresponding to the broadcasting network, information corresponding to the content being viewed on the broadcasting network;

notifying, on the basis of the request, the audience of locational information on the Internet on which the information corresponding to the content exists; and retrieving, by the audience on the basis of the locational information, the information corresponding to the content on a network other than the broadcasting network.

According to the thirteenth aspect of the present invention, there is provided a content providing program for causing a computer device to execute a content providing method for providing content linked with a broadcast program, including the steps of:

providing content by a broadcast program to the audience through a broadcasting network;

requesting, from the audience through a network corresponding to the broadcasting network, information corresponding to the content being viewed on the broadcasting network;

notifying, on the basis of the request, the audience of locational information on the Internet on which the information corresponding to the content exists; and retrieving, by the audience on the basis of the locational information, the information corresponding to the content on a network other than the broadcasting network.

According to the fourteenth aspect of the present invention, there is provided a content accumulating apparatus for accumulating content for use in a broadcast program, including:

a second database for storing content identification information for identifying content for use in a program to be broadcast for every predetermined duration unit obtained by dividing a duration of the broadcasting and storing information indicative of a time for the every predetermined duration unit at which the program is broadcast, both pieces of information being related with each other; and a first database for storing the content identification information and information indicative of a location of content identified by the content identification information, both pieces of information being related with each other.

According to the present invention, when the audience clips necessary information while viewing a program on a television receiver, the information about content on the Internet associated with the clipped information is transmitted to an information device such as a personal computer via the Internet. Consequently, the audience can get necessary information without interrupting the viewing of a program.

Further, according to the present invention, while program viewing on a television receiver is done in a conventional manner, clipping necessary information from a program being viewed allows the audience to get the information about content on the Internet associated with the clipped information and, at the same time, the information about content is transmitted to an information device such as a personal computer, so that the broadcasting and the Internet content may be interlocked with each other while making the most of the characteristics of both the broadcasting and the Internet.

Still further, according to the present invention, compilation of the clipping information by the audience allows the television station side to understand the subjects of interest of audience in more detail than the conventional audience rating.

BRIEF DESCRIPTION OF THE DRAWINGS

These and other objects of the invention will be seen by reference to the description, taken in connection with the accompanying drawing, in which:

FIGS. 5A, 5B, and 5C are diagrams illustrating exemplary configuration of databases.

DETAILED DESCRIPTION OF THE PREFERRED EMBODIMENTS

This invention will be described in further detail by way of example with reference to the accompanying drawings. In one embodiment of the present invention, when a user specifies a desired scene while viewing a television program on a television receiver, the user can get the content associated with the specified scene on the Internet by means of an information apparatus separate from this television receiver.

Figure 1A:
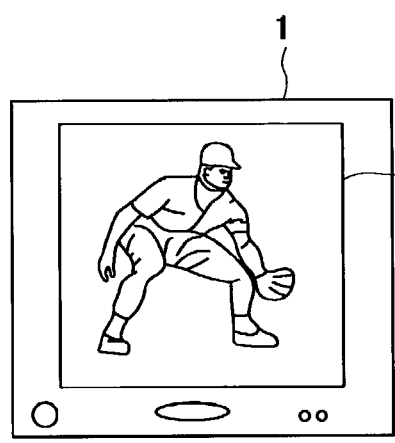
FIGS. 1A and 1B illustrate the concept of the invention.
Figure 1B:
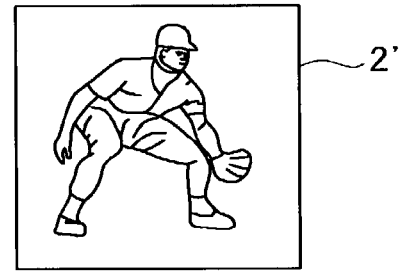

The following describes the concept of the present invention with reference to FIGS. 1A and 1B. For example, as shown in FIG. 1A, a television receiver 1 displays a scene 2 of which information is needed by a user. When the user issues a command to the television receiver 1 so as to clip this scene, this command is transmitted to a center which provides the services associated with the present invention. In response, the center searches its database for the contents on the Internet associated with the content specified for clipping and gets the information such as URI (Universal Resource Identifier) for example. The obtained information is transmitted, by use of an electronic mail on the Internet for example, to the user from whom the above-mentioned command was transmitted. Receiving the electronic mail by an information apparatus such as a personal computer for example, which is separate from the television receiver 1, the user can browse the necessary information on the screen of the personal computer as shown in FIG. 1B.

In the above-mentioned example in which information is requested about a sports program, the player's name, an image 2' of the clipped scene 2, and the URI at which the associated information can be browsed are transmitted from the center to the user in response to the clipping command issued by the user. Receiving these pieces of information, the user can get the necessary information by accessing the Internet on the basis of the URI. Also, the user can search Web sites browsed on the basis of the URI for further associated information.

Thus configured, the above-mentioned system according to the invention allows the user to get the associated information with the viewing of television broadcasting not interrupted, and at the same time, get the information which is uniquely useful for the user.

Figure 2:
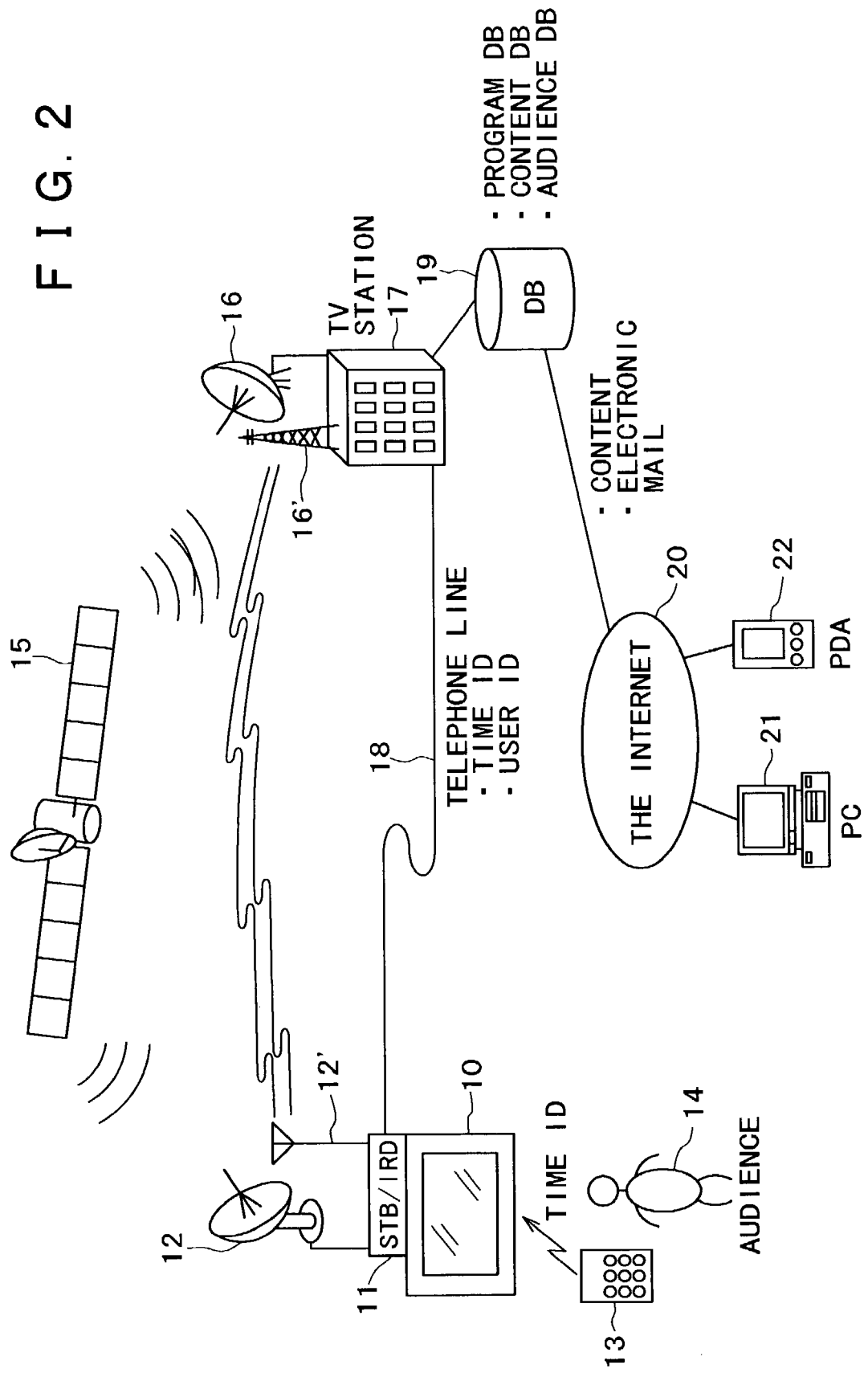
FIG. 2 is a schematic diagram illustrating an overview of a system according to the invention.

Referring to FIG. 2, there is shown a schematic diagram illustrating the system according to the invention. A television receiver 10, a personal computer 21, and a mobile information terminal (PDA) 22 are items on the side of an audience 14. A television station 17 transmits digital television signals through broadcasting facilities 16. These digital television signals are transmitted to the television receiver 10 on the side of audience 14 through a broadcasting satellite 15 to be received by a broadcasting satellite antenna 12.

In the above, the broadcasting from the television station 17 is the satellite broadcasting in which television signals are transmitted from the television station 17 to the broadcasting satellite 15. The present invention, however, is not restricted thereto. For example, the system according to the invention may execute the digital ground wave broadcasting in which the television station 17 transmits digital television signals by use of ground waves. In this case, television station 17 transmits digital television signals based on ground waves through a ground-wave broadcasting facilities 16'. These digital television signals are received at a ground-wave antenna 12' of the television receiver 10 on the side of the audience 14.

Likewise, in the above, the broadcasting from the television station 17 is BS (Broadcasting Satellite) broadcasting to be executed through the broadcasting satellite 15. The present invention, however, is not restricted thereto. For example, the present invention is also applicable to CS (Communication Satellite) broadcasting which uses a general-purpose communication satellite. Further, the present invention is applicable to CATV (Cable Television) which transmits television signals in a wired manner by use of optical cables for example.

The television receiver 10 has an STB (set-top box)/IRD (Integrated Receiver Decoder) 11 in a connected or installed manner for receiving digital television signals. The IRD also functions as a socket for the digital data multiplexed with the information associated with programs and audience in addition to video and audio data and personal computer data for example, being capable of executing complex and various kinds of processing operations. Also, the IRD has a modem for example in an installed or connected manner for the communication with the outside of this system. In the example shown in FIG. 2, the STB/IRD 11 and the television station 17 are interconnected via a telephone line 18 for transmitting data from the audience 14 to the television station 17 via the telephone line 18.

A remote control commander (hereinafter, referred to as remote controller) 13 transmits a time ID indicative of a time at which the user has performed a predetermined operation to the STB/IRD 11 by use of an infrared signal for example. For example, while viewing a program broadcast by the television station 17 on the television receiver 10 by selecting that program by the STB/IRD 11, if the audience 14 determines that necessary information is included in that program, then the audience 14 performs a corresponding predetermined operation on the remote controller 13. The time ID indicative of the time at which the remote controller 13 has been operated is transmitted to the STB/IRD 11.

For the time ID, a relative time from a program start time is used. In addition, the information indicative of an absolute time in one day may also be used as the time ID.

In the above description, the time ID is transmitted from the remote controller 13. The present invention, however, is not restricted thereto. For example, only a trigger signal corresponding to a predetermined operation may be transmitted from the remote controller 13 and the STB/IRD 11 which received this trigger signal may generate the time ID.

The time ID transmitted from the remote controller 13 is received by the STB/IRD 11. In the STB/IRD 11, a user ID unique to each device is registered in advance and stored in a memory for example thereof. In the case of the STB which receives digital BS signal, a CAS card is installed, so that it may be used as a user ID. The time ID received by the STB/IRD 11 is transmitted along with this user ID to a host computer, not shown, installed in the television station 17 via the telephone line 18 for example.

The host computer has a database 19. The database stores at least a program database and a content database and, in the example shown in FIG. 2, an audience database. For the program database, a relationship between the content of programs broadcast by television station 17 and the information held in the content database to be described later, is stored for each program, in association with the broadcast elapsed time of each program. For the content database, the content used in each program broadcast by the television station 17 and the location (URI) on the Internet of information associated with the content are stored. For the audience database, the electronic mail addresses of the audience 14 corresponding to the above-mentioned user IDs are stored. It should be noted that the specific examples of the database 19 will be described later.

In the television station 17, the host computer searches the program database on the basis of the time ID to check which content was broadcast at the time indicated by the time ID. On the basis of a result of this search operation, the content database is searched to check the URI indicative of the location on the Internet of the content concerned and the information associated with that content. Further, on the basis of the user ID, the host computer searches the audience database for the electronic mail address of the user corresponding to that user ID. Then, an electronic mail message written with the URI obtained as a result of the content database search operation is transmitted to the Internet 20 at the electronic mail address obtained as a result of the audience database search operation.

The transmitted electronic mail message is received by the information apparatus of the audience 14, the personal computer 21 for example, via the Internet 20. On the basis of the received electronic mail message, the audience 14 can acquire or browse the content existing on the Internet associated with the information determined necessary during the viewing of a television broadcasting on the television receiver 10.

Figures 3, 4:
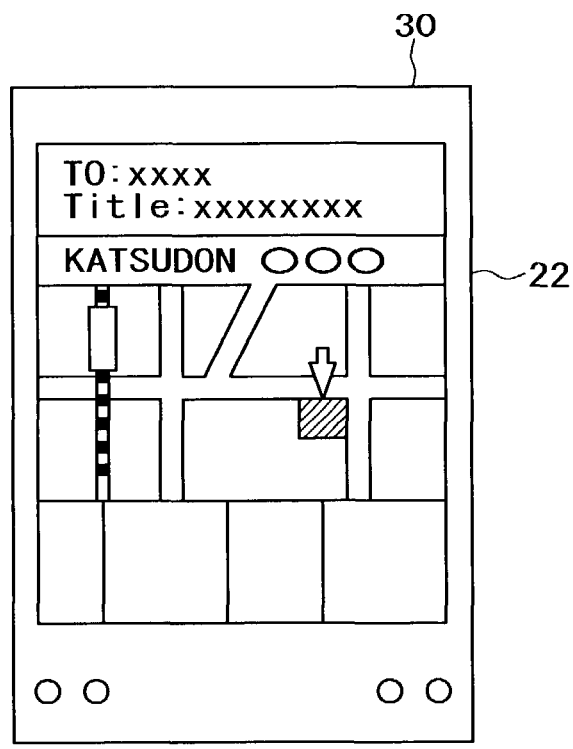
FIG. 3 is a diagram illustrating an exemplary electronic mail which is transmitted to audience.
FIG. 4 is a diagram illustrating an exemplary display of content on a mobile information terminal.

FIG. 3 illustrates one example of an electronic mail message 40 to be transmitted to the audience 14. As shown in FIG. 3, the electronic mail message 40 contains the name of a program viewed by the audience 14 and the location (URI) on the Internet of the information associated with the content of a clipping made in accordance with the operation through the remote controller 13. Many software programs (called mailers) for transferring the electronic mail message 40 have capabilities of accessing the URI by performing a predetermined operation on the description of the URI with a pointing device like a mouse. By use of these mailer capabilities, the audience 14 can obtain the necessary information from the Internet 20.

It should be noted that, if an electronic mail message is received by the mobile information terminal 22, the content may be downloaded into the mobile information terminal 22 on the basis of the URI described in the electronic mail message to allow the user to carry the mobile information terminal 22 outdoors to browse the downloaded content. FIG. 4 illustrates an example in which content is displayed on the mobile information terminal 22. In this example, the map information indicative of the location of a restaurant called "Katsudon OOO" introduced by a program is the content. A display section 30 of the mobile information terminal 22 shows a map indicative of the location of the restaurant "Katsudon OOO" which is the downloaded content. Carrying this mobile information terminal 22, the audience 14 can actually find this restaurant by referencing the map shown on the display section 30.

FIG. 5 illustrates an exemplary configuration of the database 19 described above. As shown in FIG. 5A by way of example, in a program database 51, one record has items "time ID," "still picture," "music ID," and "other content." Item "time ID" is set in a relatively short unit such as one second for example. The time unit is not restricted to one second; for example, several seconds to ten-odd seconds or several tens of seconds if the realtime nature is maintained after the time divided by a time unit is reconfigured. Item "time ID" is represented in a relative time from the program start time.

For item "still picture," still picture data obtained by clipping the video broadcast at the time indicated by item "time ID" is stored. Actually, each piece of still picture data is attached with a unique ID and managed by the program database 51 in which the still image ID, the file name or URI of the still image data corresponding to the still image ID, and other attribute information are stored, as with a content database 52 to be described later. In the program database 51, the still picture ID is stored in item "still picture," so that the still picture data corresponding to the still image ID can be referenced via a database like the content database 52.

The present invention is not restricted to the above configuration. For example, a pointer such as the file name or URI of still picture which points the storage location of still picture data may be stored in item "still picture."

Item "music ID" stores the music ID indicative of the music broadcast at the time indicated by item "time ID." Like the above-mentioned still picture ID, the music ID is related to the information about the storage location of the corresponding music data and other attribute information. Like the above-mentioned item "still picture," storing the music ID into item "music ID" allows the reference of the music data corresponding to the music ID via the content database 52 to be described later.

Item "other content" stores a pointer, a URI for example, which points the location of the content other than the above-mentioned still picture and music, among the content broadcast at the time indicated by item "time ID." The content which is stored in item "other content" may include the product and store information, the text information such as news and cooking recipes, and the numeric information such as financial information, for example, broadcast at the time indicated by the time ID. This content may also include the detail information of contents broadcast in commercials, television personality information, and map information. As with the above-mentioned still picture data and music data, item "other content" may be attached with a unique ID to reference other databases.

FIG. 5B illustrates an exemplary configuration of the above-mentioned content database 52. The content database 52 shown in FIG. 5B stores the information about music data. In the content database 52, each record is formed by item "music ID," item "music data," item "author," and item "meta data."

Item "music ID" is a unique ID for identifying each piece of music data. Item "music data" describes the location at which music data are stored. For example, the file name of music data and the URI indicative of the location of music data are stored in item "music data." Item "author" stores the information of the author of music data. Item "meta data" stores the information associated with music data. For example, if a particular record indicates a part of music data, item "meta data" describes the start time and end time of the music data indicated by that record.

As described above, still picture data and other content may also be stored in a database as with music data. In the example shown in FIG. 5B, music data are stored in the content database 52, the present invention being not restricted thereto; for example, data of various types, still picture data and other content for example, may be stored in the content database 52 together.

FIG. 5C illustrates an exemplary configuration of an audience database 53. In the audience database 53 shown in FIG. 5C, each record is formed by item "audience ID," item "mail address," and item "other information." Item "audience ID" stores the above-mentioned user ID. Item "mail address" stores the mail address at which electronic mail can be transmitted to the audience 14 corresponding to the audience ID. Item "other information" stores the attribute information of the audience 14 corresponding to item "audience ID." Item "other information" may be further formed by many items.

Figure 6:
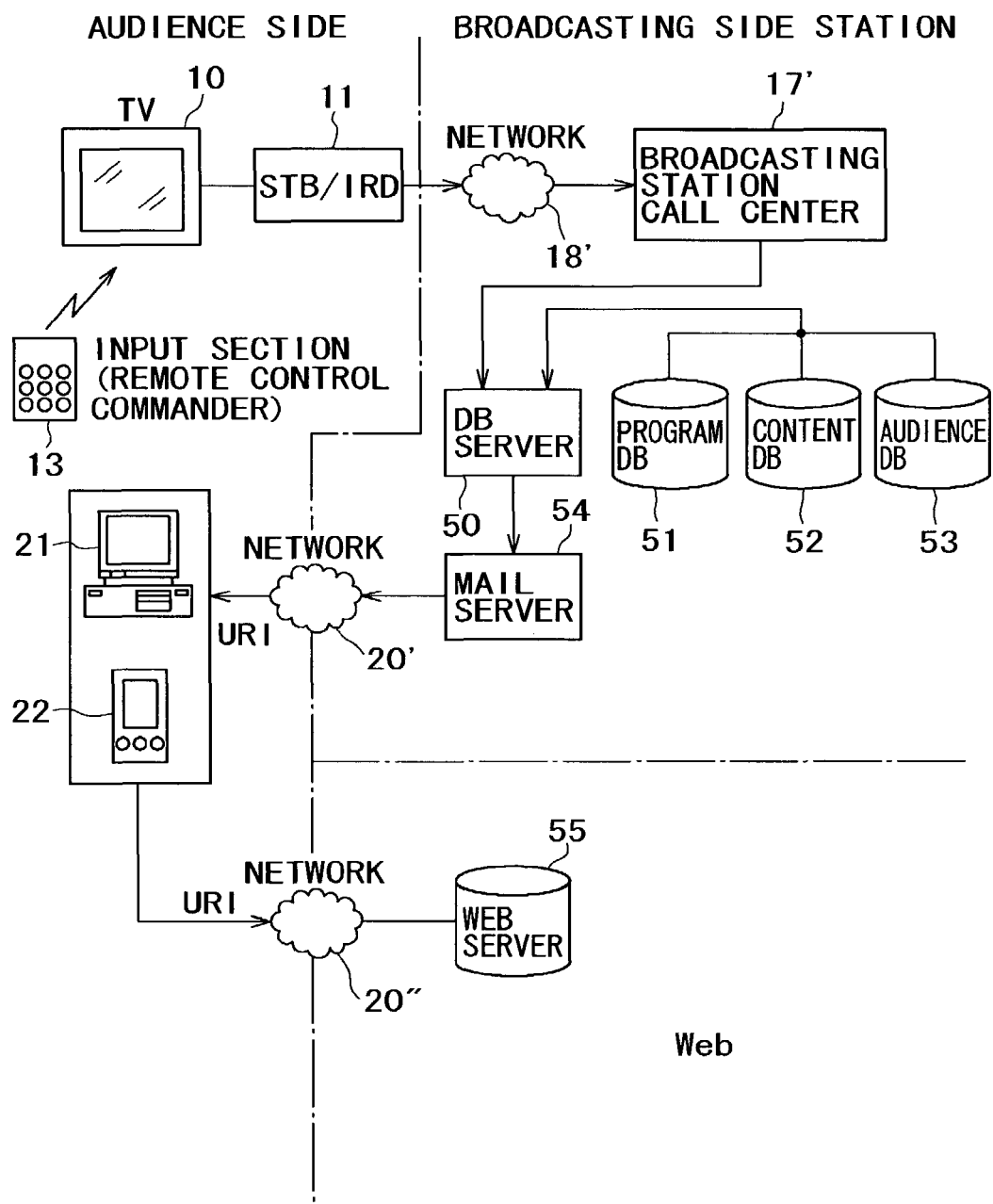
FIG. 6 is a schematic diagram specifically illustrating an exemplary system practiced as one embodiment of the invention.

FIG. 6 more specifically illustrates the system practiced as one embodiment of the invention. With reference to FIG. 6, components similar to those previously described with reference to FIG. 2 are denoted by the same reference numerals, and their descriptions will be skipped. When the necessary information is broadcast on the television broadcast received by the television receiver 10, the audience 14, not shown, transmits the time ID by use of the remote controller 13. The STB/IRD 11 adds the user ID to the transmitted time ID and the resultant signal is transmitted to a broadcasting station call center 17' of the television station 17 via a network 18' which is a telephone line for example.

The broadcasting station call center 17' provides a socket for the information transmitted from the audience 14. In this example in which the network 18' is a telephone line, many modems are installed in the broadcasting station call center 17' and the time IDs and user IDs transmitted from a plurality of audience 14 to a main phone number for example are separately received by these plural modems. The received time IDs and user IDs are once accumulated in an accumulating means, not shown, of the broadcasting station call center 17'.

It should be noted that the configuration of the broadcasting station call center 17' is not restricted to the above-mentioned configuration. For example, if the network 18' is not a telephone line but the Internet, the modem facilities are not required. In this case, too, the time ID and user ID transmitted from each audience 14 are once accumulated in the accumulating means of the broadcasting station call center 17'.

The time IDs and user IDs accumulated in the accumulating means of the broadcasting station call center 17' are read by a database server 50 in a predetermined manner. The database server 50 manages the above-mentioned program database 51, content database 52, and audience database 53. In addition, the database server 50 controls the transfer of electronic mail in the present system in a mail server 54 to be described later. Thus, the database server 50 plays the role of the central core of the present system.

The programs necessary for operating this system are provided in such a recording medium to which the database server 50 corresponds in hardware as a CD-ROM (Compact Disc Read Only Memory) and installed on the database server 50. Alternatively, these programs may be installed on the database server 50 via a predetermined network. The database server 50 may be equivalent to a generally-used database server and the technologies supporting it are well known, so that their descriptions will be skipped.

The database server 50 generates a search key in a predetermined manner based on the time ID and user ID read from the accumulating means of the broadcasting station call center 17' and searches the program database 51, the content database 52, and audience database 53 by use of the generated search key. For example, the database server 50 searches the program database 51 and the content database 52 as described above to extract the URI of the content which was broadcast at the time indicated by the time ID and the URI of the information associated with that content. In addition, on the basis of the user ID, the database server 50 searches the audience database 53 to extract the mail address of the audience 14 who transmitted that time ID and that user ID. Then, by use of the extracted mail address as the address, the database server 50 generates the electronic mail message 40 with the above-mentioned URI described.

The electronic mail message 40 is transmitted by the mail server 54 to the audience 14 at the mail address via the network 20'. The mail server 54 may be equivalent to a mail server generally used on the Internet and the technologies supporting it are well known, so that their descriptions will be skipped. The electronic mail message 40 is received by the audience 14, not shown, at an information device such as the personal computer 21 or the mobile information terminal 22. On the basis of the URI described in the received electronic mail message 40, the audience 14 can access a Web server 55 for example via a network 20" to browse or download necessary information. Downloadable content may be preferably placed in the Web server 55 beforehand to save the processing time necessary for downloading. The Web server 55 may be equivalent to such a Web server generally used on the Internet as Apache for example and the technologies supporting it are well known, so that their descriptions will be skipped.

It should be noted that, in the above, the network 20' and the network 20" are each the Internet 20 for example. The present invention, however, is not restricted thereto; for example, the network 20" for accessing the Web server 55 may be the Internet 20, while the network 20' to which electronic mail is transmitted at the address of the audience 14 from the mail server 54 may be a network other than the Internet 20. In the above, the network 18' is a telephone line, the present invention being not restricted thereto; for example, the network 18' may also be the Internet 20.

It is more preferable for the television station 17 to make, when starting broadcasting, an announcement such as "Please have a memo close at hand" for example in a program, thereby explicitly prompting the audience 14 for information clipping. This reduces the load of the audience 14 for the selecting job, making the embodiment more effective.

Further, charging the audience 14 by the television station 17 every time the audience 14 performs an information clipping operation allows the television station 17 to extract profits. The charge is about 10 yen per clipping operation, for example.

Moreover, compiling, by the television station 17, the clip operations performed by the audience 14 allows the television station 17 to get the information usable in the production or organization of programs for example. The compiled data may also be used as a barometer for programs in place of the conventional audience appreciation rating.

In the above, the audience 14 clips necessary information by viewing television broadcasting, the present invention being not restricted thereto. For example, clipping may be performed on radio broadcasting. The television broadcasting is not restricted to that via the broadcasting satellite 15; for example, the present invention is also applicable to the broadcasting based on satellite broadcasting and conventional ground-wave broadcasting. In addition, the present invention is also applicable to the ground-wave broadcasting based on the above-mentioned digital method. Obviously, the present invention is applicable to the cable television broadcasting. Moreover, in addition to the digital television broadcasting, the present invention is applicable to the analog television broadcasting.

While the preferred embodiments of the present invention have been described using specific terms, such description is for illustrative purposes only, and it is to be understood that changes and variations may be made without departing from the spirit or scope of the appended claims.

What is claimed is:

1. A method performed by a broadcasting apparatus for providing information associated with a video broadcast, the method comprising:
   receiving, from a terminal device associated with an audience member viewing the video broadcast, a time identifier identifying a time at which the audience member performs a selection operation during the video broadcast, and a user identifier identifying the audience member;
   identifying, by looking up the time identifier in a program database, an identifier of content associated with the video broadcast at the time the selection operation was performed;
   identifying, by looking up the identified content identifier in a content database, a storage location on a network of the content associated with the video broadcast at the time the selection operation was performed;
   determining, by looking up the user identifier in an audience database, an electronic mail address associated with the audience member;
   generating an electronic mail message containing:
   an indication of the time at which the selection operation was performed;
   a name of a program presented in the video broadcast at the time the selection operation was performed; and
   a uniform resource identifier (URI) for the storage location of the content associated with the video broadcast at the time the selection operation was performed; and
   transmitting the electronic mail message to the address associated with the audience member.

2. A broadcasting apparatus for providing information associated with a video broadcast, the apparatus comprising:
   means for receiving, from a terminal device associated with an audience member viewing the video broadcast, a user identifier identifying the audience member and a time identifier indicating a time at which the audience member performs a selection operation during the video broadcast;
   means for retrieving, by looking up the user identifier in an audience database, an electronic mail address associated with the audience member;
   means for identifying, by looking up the time identifier in a program database, an identifier of content associated with the video broadcast at the time the selection operation was performed;
   means for retrieving, by looking up the identified content identifier in a content database, a storage location on a network of the content associated with the video broadcast at the time the selection operation was performed;
   means for generating an electronic mail message containing:
   an indication of the time at which the selection operation was performed;
   a name of a program presented in the video broadcast at the time the selection operation was performed; and
   a uniform resource identifier (URI) for the storage location of the content associated with the video broadcast at the time the selection operation was performed; and
   means for transmitting the electronic mail message to the address associated with the audience member.

3. The broadcast apparatus according to claim 2, wherein the video broadcast is distributed through the network.

4. The broadcast apparatus according to claim 2, wherein the video broadcast is a television broadcast.

5. The broadcasting apparatus according to claim 2, wherein a remote control generates the time identifier upon the audience member performing the selection operation.

6. The broadcasting apparatus according to claim 5, wherein the time identifier indicates an absolute time.

7. The broadcasting apparatus according to claim 5, wherein the time identifier indicates a relative time from a start time of the video broadcast.

8. The broadcasting apparatus according to claim 2, wherein the electronic mail address is associated with a mobile terminal.

9. A non-transitory computer-readable medium storing instructions which, when executed by a processor associated with a broadcasting apparatus, perform a method for providing information associated with a video broadcast, the method comprising:
   receiving, from a terminal device associated with an audience member viewing the video broadcast, a time identifier identifying a time at which the audience member performs a selection operation during the video broadcast, and a user identifier identifying the audience member;
   identifying, by looking up the time identifier in a program database, an identifier of content associated with the video broadcast at the time the operation was performed;
   identifying, by looking up the identified content identifier in a content database, a storage location on a network of the content associated with the video broadcast at the time the selection operation was performed;
   determining, by looking up the user identifier in an audience database, an electronic mail address associated with the audience member;
   generating an electronic mail message containing:
   an indication of the time at which the selection operation was performed;
   a name of a program presented in the video broadcast at the time the selection operation was performed; and
   a uniform resource identifier (URI) for the storage location of the content associated with the video broadcast at the time the selection operation was performed; and
   transmitting the electronic mail message to the address associated with the audience member.

10. A broadcast system for providing information associated with a broadcast program, the system comprising:
    select information receiving means for receiving, from a terminal device associated with an audience member viewing the broadcast program, a user identifier identifying the audience member, and a time identifier indicating a time at which the user performs a selection operation during the broadcast program;
    a program storage database storing a plurality of content identifiers identifying content associated with different times during the broadcast program, and storing a plurality of respective time identifiers corresponding to the content identifiers;
    a content database storing the content identifiers and respective storage locations of the content corresponding to the content identifiers;
    an audience database storing relationships between user identifiers and an electronic mail addresses associated with audience members;
    information searching means for:
    searching the program storage database using the time identifier for a corresponding content identifier;
    searching the content database using the corresponding content identifier for a corresponding storage location of the content associated with the broadcast program at the time the selection operation was performed;

retrieving, from the audience database, an electronic mail address of the audience member based on the user identifier;

means for generating an electronic mail message containing:

an indication of the time at which the selection operation was performed;

a name of a program presented during the broadcast program at the time the selection operation was performed; and a uniform resource identifier (URI) for the storage location of the content associated with the broadcast program at the time the selection operation was performed; and means for transmitting the electronic mail message to the address of the audience member.

11. An apparatus for providing information associated with a broadcast program, comprising:

a content database storing storage locations on a network of content associated with the broadcast program, and storing respective content identifiers corresponding to the storage locations;

a program database storing relationships between the content identifiers and respective time identifiers corresponding to different times during the broadcast program;

an audience database storing relationships between user identifiers and electronic mail addresses of audience members of the broadcast program;

receiving means for receiving, from a terminal device associated with an audience member, a user identifier identifying the audience member and a time identifier identifying a time at which the audience member performs a selection operation during the broadcast program;

transmitting means for:

searching the program database based on the time identifier to identify a corresponding content identifier identifying content associated with the broadcast program at the time the selection operation was performed;

searching the content database based on the corresponding content identifier to identify a respective storage location on the network of the content associated with the broadcast program at the time the selection operation was performed; and retrieving, from the audience database, an electronic mail address of the audience member with the user identifier;

generating an electronic mail message containing:

an indication of a time at which the selection operation was performed;

a name associated with the broadcast program at the time the selection operation was performed; and a uniform resource identifier (URI) for the storage location of the content associated with the broadcast program at the time the selection operation was performed; and transmitting the electronic mail message to the address of the audience member.

12. The apparatus according to claim 11, wherein the broadcast program is a television broadcast.

13. The apparatus according to claim 11, wherein the time identifier is generated using a remote control.

14. A broadcast system for providing content associated with a broadcast program, comprising:

content providing means for providing the broadcast program to a terminal device associated with an audience member through a broadcasting network;

information requesting means for requesting, from the terminal device, a time identifier identifying a time of a selection operation performed by the audience member during the broadcast program;

means for identifying, by looking up the time identifier in a program database, an identifier of content associated with the broadcast program at the time the selection operation was performed;

means for identifying, by looking up the identified content identifier in a content database, a storage location on a network of the content associated with the broadcast program at the time the selection operation was performed;

means for determining, by looking up a user identifier associated with the audience member in an audience database, an electronic mail address associated with the audience member;

means for generating an electronic mail message containing:

an indication of the time at which the selection operation was performed;

a name of a program segment of the broadcast program presented at the time the selection operation was performed; and a uniform resource identifier (URI) for the storage location of the content associated with the broadcast program at the time the selection operation was performed; and means for sending the electronic mail message to the address associated with the audience member.

15. A method performed by a broadcasting system for providing content associated with a broadcast program, the method comprising:

providing the broadcast program to a terminal device associated with an audience member through a broadcasting network;

requesting, from the terminal device, a time identifier identifying a time of a selection operation performed by the audience member during the broadcast program;

identifying, by looking up the time identifier in a program database, an identifier of content associated with the broadcast program at the time the selection operation was performed;

identifying, by looking up the identified content identifier in a content database, a storage location on a network of the content associated with the broadcast program at the time the selection was performed;

determining, by looking up a user identifier associated with the audience member in an audience database, an electronic mail address associated with the audience member;

generating an electronic mail message containing:

an indication of the time at which the selection operation was performed;

a name of a program segment of the broadcast program presented at the time the selection operation was performed; and a uniform resource identifier (URI) for the storage location of the content associated with the broadcast program at the time the selection operation was performed; and sending the electronic mail message to the address associated with the audience member.

16. A non-transitory computer-readable medium storing instructions which, when executed by a processor associated with a broadcast system, perform a method for providing content associated with a broadcast program, the method comprising:

providing the broadcast program to a terminal device associated with an audience member through a broadcasting network;

requesting, from the terminal device, a time identifier identifying a time of a selection operation performed by the audience member during the broadcast program;

identifying, by looking up the time identifier in a program database, an identifier of content associated with the broadcast program at the time the selection operation was performed;

identifying, by looking up the identified content identifier in a content database, a storage location on a network of the content associated with the broadcast program at the time the selection was performed;

determining, by looking up a user identifier associated with the audience member in an audience database, an electronic mail address associated with the audience member;

generating an electronic mail message containing:

an indication of a time at which the selection operation was performed;

a name of a program segment of the broadcast program presented at the time the selection operation was performed; and a uniform resource identifier (URI) for the storage location of the content associated with the broadcast program at the time the selection operation was performed; and sending the electronic mail message to the address associated with the audience member.

17. An apparatus for accumulating content for use in a broadcast program, the apparatus comprising:

a program database storing content identification information, the content identification information identifying content associated with respective program segments of the broadcast program, the program segments obtained by dividing a duration of the broadcast program, and storing corresponding time information for the program segments;

a content database storing storage locations on a network of the content associated with the respective program segments of the broadcast program;

an audience database storing user identification information and electronic mail addresses of audience members of the broadcast program corresponding to the user identification information; and means for, upon notification of a time of a selection operation performed by an audience member during the broadcast program:

searching the program database, based on the time the selection operation was performed, to identify content identification information associated with a program segment presented in the broadcast program at the time the selection operation was performed;

searching the content database, based on the identified content identification information, to retrieve a storage location of content associated with the program segment presented in the broadcast program at the time the selection operation was performed; and searching the audience database, based on the user identification information, to identify an electronic mail address of the audience member of the;

generating an electronic mail message containing:

an indication of the time the selection operation was performed;

a name of the program segment presented at the time of selection operation was performed; and a uniform resource identifier (URI) for the storage location of the content associated with the program segment presented at the time of the selection; and sending the electronic mail message to the address associated with the audience member.

18. The apparatus according to claim 17, wherein, if the broadcast program is a moving picture, the moving picture is clipped as a still picture for the program segments and the still picture is stored in the program database.

* * * * *